(12) United States Patent
Noy et al.

(10) Patent No.: US 6,212,476 B1
(45) Date of Patent: Apr. 3, 2001

(54) APPARATUS TO MEASURE THE EARTH'S LOCAL GRAVITY AND MAGNETIC FIELD IN CONJUNCTION WITH GLOBAL POSITIONING ATTITUDE DETERMINING

(75) Inventors: Koen Antonie Noy, Almerhout (NL); Robert Alan Estes, Tomball; Hatem Salem Morsy, The Woodlands, both of TX (US)

(73) Assignee: Baker Hughes Incorporated ( * ) Notice: Subject to any disclaimer, the term of this patent is extended or adjusted under 35 U.S.C. 154(b) by 0 days.

(21) Appl. No.: 09/309,864

(22) Filed: May 11, 1999

Related U.S. Application Data

(60) Provisional application No. 60/095,471, filed on May 14, 1998.

(51) Int. Cl.$^7$ .............................. E21B 47/22; G01C 17/00
(52) U.S. Cl. .................................. 702/9; 324/345; 702/10

(56) References Cited

U.S. PATENT DOCUMENTS

| | | | | |
|---|---|---|---|---|
| 4,458,205 | * | 7/1984 | Hings .................................. | 324/345 |
| 4,766,385 | * | 8/1988 | Polvani .............................. | 324/345 |
| 5,617,317 | | 4/1997 | Ignani ................................. | 364/453 |
| 5,629,626 | * | 5/1997 | Russell .............................. | 324/345 |

FOREIGN PATENT DOCUMENTS

0437372A2   7/1991  (EP).

WO98/07958   2/1998  (WO).

* cited by examiner

Primary Examiner—Donald E. McElheny, Jr.
(74) Attorney, Agent, or Firm—Madan, Mossman & Sriram, P.C.

(57) ABSTRACT

A processor uses signals from at least two GPS receivers and a 3-component accelerometer located on a stable non-magnetic platform to determine the roll, yaw and pitch angles of the platform, thus providing a measurement of geographic north. The processor also uses signals from a 3-component magnetometer on the platform to determine the magnetic north and thence the magnetic declination. A proton magnetometer is used to provide a check on the measurements of the 3-component magnetometer. Additionally, three single component magnetometers provide a measure of the local magnetic field gradient and serve to monitor artificially induced magnetic fields. An alternate embodiment of the invention uses at least three GPS receivers and may dispense with the 3-component of accelerometer to determine geographic north. Temporal local variations of the earth's magnetic field are tracked and used to correct conventional magnetic well surveys. For use in offshore drilling applications where the rig is on a drillship, the platform floats on water away from the drillship and tethered to a buoy. Signals from an inertial motion sensor are used by the processor to correct the observations of the GPS sensors, the magnetometers and the accelerometers for the motion of the platform in water.

30 Claims, 1 Drawing Sheet

APPARATUS TO MEASURE THE EARTH'S LOCAL GRAVITY AND MAGNETIC FIELD IN CONJUNCTION WITH GLOBAL POSITIONING ATTITUDE DETERMINING

This application claims benefit of Provisional application Ser. No. 60/095,491, filed May 14, 1998.

FIELD OF THE INVENTION

The invention relates to an apparatus to measure the local gravity and magnetic fields in conjunction with position determinations using Global Positioning System (GPS) sensors. Specifically, it relates to an apparatus and method used to determine the local magnetic field strength, declination and dip angle at a site in the proximity of a drillsite to facilitate the drilling of deviated holes in exploration and development of hydrocarbon reservoirs.

BACKGROUND OF THE INVENTION

In the drilling of wells in hydrocarbon exploration and development, it is common to drill boreholes that deviate significantly from the vertical. The drillbit in such deviated holes is controlled to make the trajectory of the wellbore follow a desired trajectory to intersect producing reservoirs at desired locations. Various surveying techniques are used to determine the position of the wellbore. In addition to inertial and gravity measurements, these techniques include determination of the direction of the earth's magnetic field.

The magnetic surveys are referenced to the magnetic north direction, i.e., the direction approximately defined by a magnetic compass. Most people incorrectly believe that a compass needle points to the north magnetic pole. But since the Earth's field is the effect of complex convection currents in the magma, which must be described as several dipoles, each with a different intensity and orientation, the compass actually points to the sum of the effects of these dipoles at any location. In other words, it aligns itself with the magnetic lines of force. Other factors, of local and solar origin, further complicate the resulting field. It may be all right to say that a compass needle points "magnetic north" but it only roughly points to the north magnetic dip pole.

Predictive geomagnetic models such as the World Magnetic Model (WMM) and the International Geomagnetic Reference Field (IGRF) only predict the values of that portion of the field originating in the deep outer core. In this respect, they are accurate to within one degree for five years into the future, after which they need to be updated. The Definitive Geomagnetic Reference Field (DGRF) model describes how the field actually behaved. Numerous publications give values of the magnetic declination using these models. These include the 1:39,000,000 Magnetic Variation chart of "The Earth's Magnetic Field" series published by the Defense Mapping Agency (USA), "The World Magnetic Variation 1995 and Annual Rates of Change" chart published by the British Geological Survey, and a 1:48,000,000 world declination chart of "The Magnetic Field of Earth" series that is published by the United States Geological Survey's Earth Sciences Information Center.

Local anomalies originating in the upper mantle, crust, or surface, distort the WMM or IGRF predictions. Ferromagnetic ore deposits; geological features, particularly of volcanic origin, such as faults and lava beds; topographical features such as ridges, trenches, seamounts, and mountains; ground that has been hit by lightning and possibly harboring fulgurites; cultural features such as power lines, pipes, rails and buildings; personal items such as crampons, ice axe, stove, steel watch, hematite ring or even a belt buckle, frequently induce an error of three to four degrees.

The stream of ionized particles and electrons emanating from the Sun, known as solar wind, distorts the Earth's magnetic field. As it rotates, any location will be subject alternately to the lee side, then the windward side of this stream of charged particles. This has the effect of moving the magnetic poles around an ellipse several tens of kilometers in diameter, even during periods of steady solar wind without gusts. The resulting diurnal change in declination is relatively small at tropical and temperate latitudes compared to the effect of local anomalies. For example, Ottawa is subject to plus or minus 0.1 degree of distortion. However; in Resolute, 500 kilometers from the north magnetic pole, the diurnal change cycles through at least plus or minus nine degrees of declination error. This error could conceivably be corrected, but both the time of day and the date would have to be considered, as this effect also varies with seasons.

The solar wind varies throughout an 11-year sunspot cycle, which itself varies from one cycle to the next. During severe magnetic storms, compass needles at high latitudes have been observed swinging wildly.

In typical downhole surveys, the position of the borehole is determined to within an accuracy of 3 ft per 1000 ft. of lateral displacement relative to the top of the borehole. Even a 1 degree error in the magnetic declination used in the survey makes an error of over 15 feet in lateral displacement at an offset of 1000 ft. This can be problematic in the case of wells drilled over a period of several years in the development of a field. In addition, leases including OCS lease sales periodically conducted by the United States Government involve the leasing of tracts designated in terms of geographic coordinates. It is important in the development of fields that any wellbore survey carried out using a magnetic reference be referred back to geographic directions and coordinates.

Magnetic borehole survey instruments measure direction with respect to the local magnetic field. All magnetic surveys are subject to errors if the horizontal component of the local magnetic field is not aligned with the local magnetic north. Errors of this kind may be caused by distortion of the local magnetic field by magnetic BHA materials in the borehole. Drillstring conveyed magnetic survey tools are usually run inside non-magnetic drill collars. However, it is not unusual for the measurement to be influenced by adjacent magnetic drillstring material. Therefore, frequent use is made of techniques to detect and subsequently remove errors due to drillstring magnetization. These techniques rely on the principle of having accurate earth's field data available, i.e. local earth's magnetic field strength and local earth's magnetic dip angle. Hence this invention also provides a technique to provide accurate local earth's field data to allow to correct the data due to magnetic interference.

The "Mag-01H declinometer/inclinometer" of Bartington Instruments comprises a single axis fluxgate magnetometer, with the magnetometer sensor mounted on a non-magnetic optical theodolite. As is noted in the description provided by Bartington Instruments:

"The magnetic axis of the sensor is aligned with the optical telescope of the theodolite and only records the strength of the component of the field along that axis. The theodolite is carefully leveled and the magnetic sensor axis is set to the horizontal position and rotated until a null is observed in the magnetic field. At this position the sensor is exactly normal to the earth's magnetic field and from the theodolite reading the direction of the field in the horizontal plane can be established. The true north direction is determined from solar or star observation or using a gyroscope, and the declination can then be calculated."

The necessity of establishing the true north direction from astronomical observations complicates the determination of magnetic declination. In addition, the theodolite observations noted above require human interaction while the use of a gyroscope has its own problems, particularly those associated with calibration and drift of the gyroscope.

The best navigational tool available for determining the position of an observation point on the surface of the earth is based on signals from Global Positioning System (GPS) satellites. Most GPS receivers have internal data and an algorithm to compute the declination after the position is established. The algorithm is based upon models such as the IGRF model and does not account for local and temporal variations. In any case, this data cannot be updated from satellite transmission, therefore it is subject to become outdated.

Accordingly, there is a need for an invention that determines the local Earth's magnetic field, local dip angle and declination at a borehole with a high degree of accuracy with a minimum of human intervention. Such an invention should preferably also have the capability of tracking the time-varying component of the magnetic field, i.e. local magnetic field, local dip angle and declination, whether it is caused by diurnal variation or by geomagnetic storms.

SUMMARY OF THE INVENTION

The present invention is an apparatus and a method for determination of the local earth's magnetic field, local earth's dip angle and declination. A platform made of nonmagnetic material is located at a distance of 100 to 200 ft. from the wellsite. Based upon observations at a pair of GPS receivers at opposite ends of the platform, a processor determines the orientation of the longitudinal axis of the platform with respect to due north. Near the center of the platform, a 3-component magnetometer is used to provide a measurement of the magnetic field of the earth and give its direction with respect to the axis of the platform. A 3-component accelerometer provides measurements of the roll and tilt of the platform. A processor analyzes the data to determine the angle that the axis of the platform makes with the horizontal component of the earth's magnetic field and thence the magnetic declination. A photon magnetometer that provides a measurement of the total magnetic field serves as a check on the 3-component magnetometer. In addition, three supplementary single component magnetometers are used for quality control. For use in marine applications, the rig is on a drillship and the stable platform is tethered to buoys away from the drillship. The platform is provided with an inertial navigation sensor, the output of which are used to correct for motion of the platform.

BRIEF DESCRIPTION OF THE DRAWINGS

For a detailed understanding of the present invention, reference should be made to the following detailed description of the preferred embodiment, taken in conjunction with the accompanying drawings, in which like elements have been given like numerals, wherein.

DETAILED DESCRIPTION OF THE INVENTION

Figure 1:
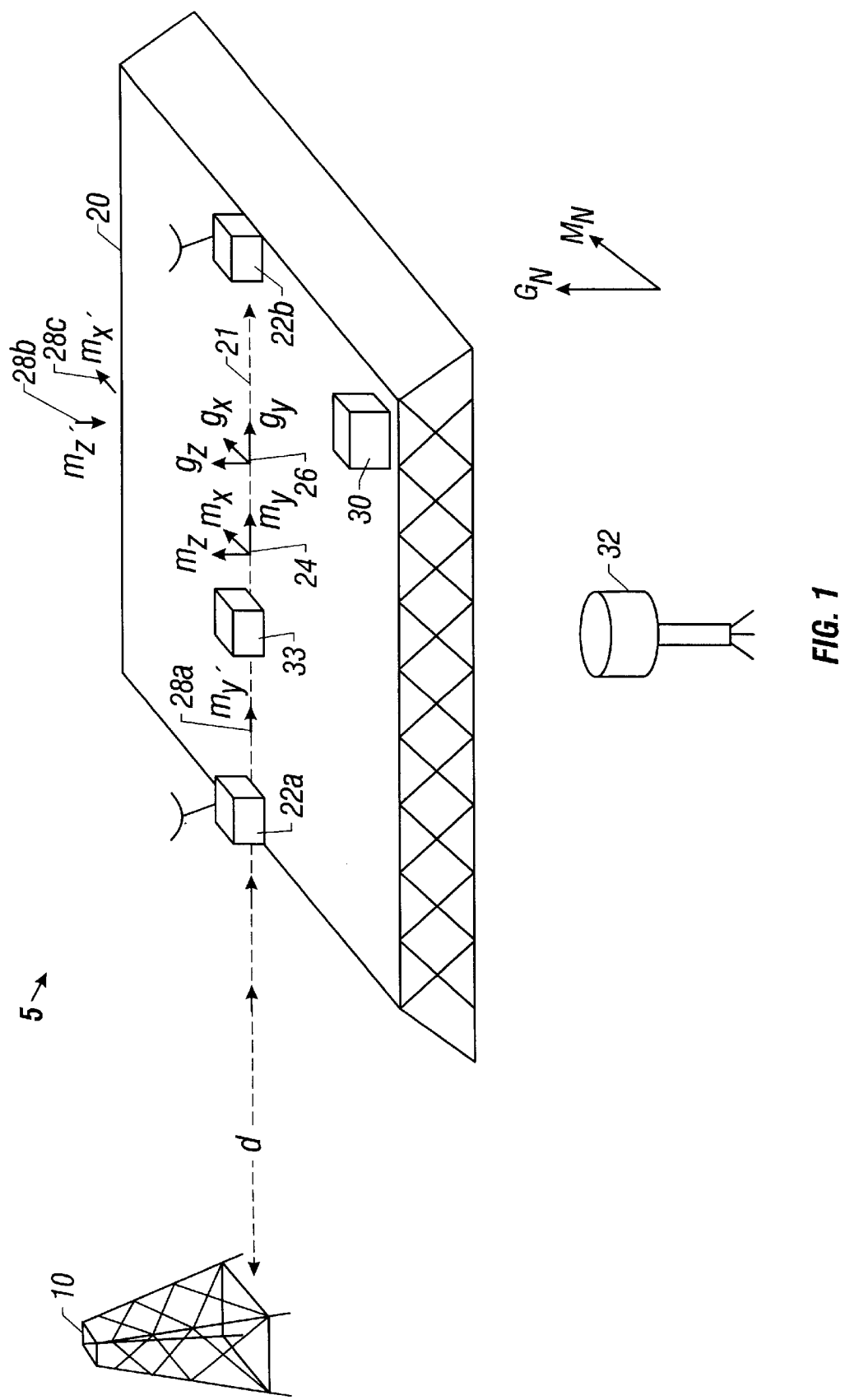
FIG. 1 shows a schematic view of the apparatus of the present invention.

The main component parts of the present invention are illustrated in FIG. 1. A drilling rig 10 is shown on the surface of the earth 5. At a distance d from the drilling rig, a stable platform 20 is located, the platform having a longitudinal axis generally indicated by 21. The distance d is typically between 100 and 200 feet. The platform is made of a non-magnetic material, such as fiberglass, to avoid the introduction of any local magnetic perturbations.

Also located on the platform are at least two GPS receivers, indicated here by 22a and 22b. In the illustration, without limitation, they are shown as being positioned along the longitudinal axis of the platform. Those versed in the art would recognize that as long as the two GPS receivers 22a and 22b are on a line whose orientation to the longitudinal axis of the platform is known, the invention as described below would still function.

Located on the surface of the platform is a 3-component magnetometer, indicated here by 24. For purposes of illustration, the three components ($m_z$, $m_y$ and $m_x$) of the magnetic field of the earth measured by the magnetometer 24 are indicated by arrows as being perpendicular to the surface of the platform, along the longitudinal axis of the platform and at right angles to the longitudinal axis of the platform. These three components are orthogonal to each other. Also located on the surface of the platform is a 3-component accelerometer 26 that measures the components of gravity $g_x$, $g_y$ and $g_z$ in the x, y, and z directions.

A processor 30 that may be located on or in the vicinity of the platform, receives signals from the GPS receivers 22a and 22b, the magnetometer 24 and the accelerometer 26. The signals may be transmitted by any suitable telemetry means, including wires, fiber optics or by radio transmission. The method of determining the attitude of the GPS receivers with respect to each other is based upon the NAVSTAR GPS based Attitude Determination System incorporated in a product sold under the mark STINGRAY® by Collins Avionics and Communications Division of Rockwell. A summary of the technique used to determine the attitude of the two GPS receivers is given here.

The absolute phase of the GPS carrier frequency can be measured in an accuracy of better than $\frac{1}{100}$ of a wavelength. The GPS signal designated as L1 has a wavelength of about 19 cm. and the GPS signal designated as L2 has a wavelength of 25 cm. Accordingly, relative carrier phase measurements utilizing differential carrier phase techniques (interferometry) accurately determine the relative position between the two antennas to an accuracy of the order of 1 mm.

Since the carrier has no ranging information, the range to a particular satellite consists of the measured fractional carrier phase plus an unknown number of carrier cycles. This is called the carrier cycle ambiguity. In STINGRAY®, a first phase difference is formed for the two receivers and a single satellite. This is repeated for a second satellite to give a second phase difference. A double difference is computed between the first and second phase difference that is related to the known distance between the two receivers. By performing this for four different satellites, a unique solution for the attitude of the two receivers with respect to each other is obtained. Rockwell claims that the solutions may be obtained in less than one second when the two receivers are one meter apart while several seconds are required to obtain a solution for longer baselines.

Note that the plurality of satellites required for this process in the present invention does not require that all satellites be in view simultaneously. The platform is known to be stationary, so that multiples passes of the same satellite, or of less than four satellites suffices to determine the attitude of the platform.

One aspect of the present invention uses the product STINGRAYS in a embedded configuration with two GPS antennas and the necessary cabling and interface to implement the additional features of the present invention. Using two antennas provides an estimate of only two of the parameters characterizing the line joining the two receivers: these are the yaw angle (corresponding to the azimuth) and the tilt angle. In the present invention the processor 30 also receives signals from the accelerometer 26. These provide estimates of the roll and tilt of the platform using methods known in the art. Thus, the tilt angle is measured redundantly. An additional level of redundancy is provided in the invention by the measurements made by a proton magnetometer 32 that is part of the measurement assembly. The proton magnetometer 32 gives the total magnetic field intensity. This serves as a check on the three components measured by the magnetometer 24: the magnitude of the vector sum of the three components measured by the magnetometer 24 must equal the value measured by the proton magnetometer 32. The yaw angle of the platform as determined by the processor gives the orientation of the platform with respect to geographic north. The difference between this and the direction of the horizontal component of the earth's magnetic field, as determined from the magnetometer measurements gives a measurement of the declination at the platform with an accuracy of 0.1°. This is a considerable improvement over prior art methods.

Another embodiment of the invention uses more than two GPS receivers arranged so that they do not lie on a straight line. This makes it possible to determine all three angles characterizing the fixed platform just from the GPS measurements. In such a case, the accelerometers provide redundant measurements that may be used to make more accurate estimates of the orientation of the platform. As discussed above, the yaw angle gives the geographic north direction.

Those versed in the art would appreciate that with the invention as described above, it is possible to get measurements of the local magnetic field, local dip angle and declination in a relatively short time. This makes it possible to track any temporal variation in the local earth's magnetic field, local earth's dip angle and declination due to causes discussed above. A borehole magnetic survey conducted using conventional apparatus could then be corrected to give a downhole survey referenced to geographic coordinates by applying the time-varying corrections determined by the apparatus and method discussed above.

The present invention also includes three single component magnetometers labeled 28a, 28b and 28c that are at locations displaced in the y, z and x directions from the magnetometer 26. Differences between values measured by these three single component magnetometers and the corresponding components measured by magnetometer 26 gives a measurement of the local magnetic field gradient. This serves as a quality control measurement. For example, a bucket of nails placed near the platform inadvertently will provide a large change in the magnetic gradient that is easily detectable and appropriate remedial steps can be taken.

For use in offshore applications, a second embodiment of the invention is used. In such applications, the rig 10 is carried on a drillship (not shown). Such drillships are inherently made of magnetic materials such as steel, and to avoid the magnetic disturbances caused by the drillship, the platform 10 is tethered to one or more buoys (not shown) at a distance d from the rig. However, the marine environment causes a second problem: due to wave motion, the platform will be in motion, thus rendering the assumptions made in the discussion of the landbased system erroneous. In particular, GPS positioning measurements are particularly susceptible to errors caused by heave of the platform.

The embodiment used in a marine environment includes an Inertial Measurement Unit (IMU) 33 on the platform. The IMU comprises an inertial grade Gyro Platform that provides accurate measurements relating to the motion of the platform. The processor 30 is preferably located on the drillship. Those versed in the art would recognize that GPS measurements may not be available continuously, so that in the marine environment, the processor uses the measurements from the GPS receivers 22a and 22b and discrete times, and the processor 30 applies a Kalman filter to the GPS receiver data and the motion data from the IMU to give filtered indications of the position and velocity of the platform. The data from the GPS receivers 22a and 22b are relatively insensitive to heaving motion of the platform and the processor uses the data from the IMU 33 to obtain accurate estimates of heave. The use of a Kalman filter to make such determinations would be known to those versed in the art.

The foregoing description has been limited to specific embodiments of this invention. It will be apparent, however, that variations and modifications may be made to the disclosed embodiments, with the attainment of some or all of the advantages of the invention. Therefore, it is the object of the appended claims to cover all such variations and modifications as come within the true spirit and scope of the invention.

What is claimed is:

1. An apparatus for determination of the magnetic declination at a location on the earth, comprising:
   (a) a non-magnetic platform for providing a stable base;
   (b) at least two spaced apart Global Positioning Sensor (GPS) receivers on the non-magnetic platform, the at least two GPS receivers adapted to receive electromagnetic signals from a plurality of satellite positions for providing signals indicative of the position of the at least two GPS receivers;
   (c) a 3-component magnetometer on the non-magnetic platform for measuring three independent components of the earth's magnetic field and providing signals indicative thereof;
   (d) a 3-component accelerometer on the non-magnetic platform for measuring three independent components of acceleration and providing signals indicative thereof; and
   (e) a processor for processing signals from the at least two GPS receivers, the 3-component accelerometer and the 3-component magnetometer to determine the magnetic declination.

2. The apparatus of claim 1 further comprising three single-axis magnetometers for providing measurements of the earth's magnetic field at locations spaced apart from said 3-component magnetometer.

3. The apparatus of claim 1 further comprising a proton magnetometer for measurement of the total magnetic intensity of the earth's magnetic field and providing a signal indicative thereof to said processor.

4. The apparatus of claim 1 wherein the processor is further adapted to
   (i) determine the geographic north from the signals from the at least two GPS receivers and the 3-component accelerometer; and
   (ii) determine the magnetic north from the signals from the 3-component magnetometer and the 3-component accelerometer.

5. The apparatus of claim 1 wherein the processor is further adapted to perform an operation selected from (i) determining a dip angle of the earth's magnetic field from the signals from the 3-component accelerometer and 3-component magnetometer and (ii) determining the earth's total magnetic field from the 3-component magnetometer.

6. The apparatus of claim 3 wherein the processor is further adapted to use the earth's total field from the proton magnetometer as a check on the measurements of the 3-component magnetometer.

7. The apparatus of claim 1 wherein the non-magnetic platform is floating on a body of water, the apparatus further comprising an inertial motion sensor (IMU) for providing signals indicative of motion of the non-magnetic platform and the processor further processes signals from the IMU to provide a parameter of interest of the motion of the non-magnetic platform.

8. The apparatus of claim 7 wherein the parameter of interest is at least one of: (i) roll of the platform, (ii) yaw of the platform, (iii) pitch of the platform, and (iv) heave of the platform.

9. An apparatus for determination of the magnetic declination at a location on the earth, comprising:
    (a) a non-magnetic platform for providing a stable base;
    (b) at least three spaced apart non-collinear Global Positioning Sensor (GPS) receivers on the non-magnetic platform, the at least three GPS receivers adapted to receive electromagnetic signals from a plurality of satellite positions for providing signals indicative of the position of the at least three GPS receivers;
    (c) a 3-component magnetometer on the non-magnetic platform for measuring three independent components of the earth's magnetic field and providing signals indicative thereof; and
    (d) a processor for processing signals from the at least three GPS receivers and the 3-component magnetometer to determine the magnetic declination.

10. The apparatus of claim 9 further comprising a 3-component accelerometer on the non-magnetic platform for measuring three independent components of acceleration and providing signals indicative thereof to the processor.

11. The apparatus of claim 9 further comprising a proton magnetometer for measurement of the total magnetic intensity of the earth's magnetic field and providing a signal indicative thereof to said processor.

12. The apparatus of claim 9 wherein the non-magnetic platform is floating on a body of water, the apparatus further comprising an inertial motion sensor (IMU) for providing signals indicative of motion of the non-magnetic platform and the processor further processes signals from the IMU to provide a parameter of interest of the motion of the non-magnetic platform.

13. The apparatus of claim 12 wherein the parameter of interest is at least one of:
    (i) roll of the platform, (ii) yaw of the platform, (iii) pitch of the platform, and (iv) heave of the platform.

14. A method for determination of the magnetic declination at a location on the earth, comprising:
    (a) placing at least two Global Positioning Sensor (GPS) receivers, a 3-component accelerometer and a 3-component magnetometer on a non-magnetic platform, said at least two GPS receivers spaced apart from each other;
    (b) receiving electromagnetic signals from a plurality of satellites at the at least two GPS receivers;
    (c) providing signals indicative of the position of the at least two GPS receivers to a processor;
    (d) measuring three independent components of the earth's magnetic field with the 3-component magnetometer and providing signals indicative thereof to the processor;
    (e) measuring three independent components of acceleration using the 3-component accelerometer and providing signals indicative thereof to the processor; and
    (e) using the processor to process the signals from the at least two GPS receivers, the 3-component accelerometer and the 3-component magnetometer to determine the magnetic declination.

15. The method of claim 14 further comprising using three single-axis magnetometers at locations spaced apart from said 3-component magnetometer for providing measurements relating to a gradient of the earth's magnetic field.

16. The method of claim 14 further comprising:
    (i) using a proton magnetometer for measurement of the total magnetic intensity of the earth's magnetic field and providing a signal indicative thereof to said processor; and
    (ii) including the signal from the proton magnetometer in the processing of signals by the processor to determine the magnetic declination.

17. The method of claim 14 wherein using the processor further comprises:
    (i) determining a yaw angle from the signals from the at least two GPS receivers and the 3-component accelerometer;
    (ii) determining a magnetic north direction from the signals from the 3-component magnetometer and the 3-component accelerometer; and
    (iii) determining the magnetic declination from the results of (i) and (ii).

18. The method of claim 14 wherein the non-magnetic platform is floating on a body of water, and using the processor further comprises:
    (i) using an inertial motion sensor (IMU) on the non-magnetic platform for providing signals indicative of motion thereof; and
    (ii) filtering the signals from the IMU, the signals from the at least two GPS receivers, the 3-component accelerometer and the 3-component magnetometer to determine the declination.

19. The method of claim 18 further comprising using the processor to obtain at least one of: (A) roll of the platform, (B) yaw of the platform, (C) pitch of the platform, and (D) heave of the platform.

20. The method of claim 18 wherein the filter is a Kalman filter.

21. A method for determination of the magnetic declination at a location on the earth, comprising:
    (a) placing at least three spaced apart Global Positioning Sensor (GPS) receivers and a 3-component magnetometer on a stable non-magnetic platform, said three GPS receivers not arranged co-linearly;
    (b) receiving electromagnetic signals from a plurality of satellites at the at least three GPS receivers and providing signals indicative of the position of the at least three GPS receivers to a processor;
    (c) using the 3-component magnetometer on the non-magnetic platform to measure three independent components of the earth's magnetic field and providing signals indicative thereof to the processor; and
    (d) using the processor to process signals from the at least three GPS receivers and the 3-component magnetometer to determine the magnetic declination.

22. The method of claim 21 further comprising using three single-axis magnetometers at locations spaced apart from said 3-component magnetometer for providing measurements relating to components of a gradient of the earth's magnetic field.

23. The method of claim 21 further comprising:
  (i) using a proton magnetometer for measurement of the total magnetic intensity of the earth's magnetic field and providing a signal indicative thereof to said processor; and
  (ii) including the signal from the proton magnetometer in the processing of signals by the processor to determine the magnetic declination.

24. The method of claim 21 wherein the step of using the processor includes:
  (i) determining of a yaw angle and a roll angle from the signals from the at least three GPS receivers;
  (ii) determining a magnetic north direction from the signals from the 3-component magnetometer and said yaw and roll angles; and
  (iii) determining the magnetic declination from the results of (i) and (ii).

25. The method of claim 21 wherein the non-magnetic platform is floating on a body of water, and using the processor further comprising:
  (i) using an inertial motion sensor (IMU) for providing signals indicative of motion of the non-magnetic platform; and
  (ii) filtering the signals from the IMU, the signals from the at least two GPS receivers, the 3-component accelerometer and the 3-component magnetometer.

26. The method of claim 25 further comprising using the processor to obtain at least one of: (A) roll of the platform, (B) yaw of the platform, (C) pitch of the platform, and (D) heave of the platform.

27. A method for obtaining corrected survey data in a borehole, comprising:
  (a) conducting a magnetic survey in a borehole over a known time interval to give a set of magnetic survey data referenced to the local magnetic field;
  (b) placing at least two spaced apart Global Positioning Sensor (GPS) receivers, a 3-component accelerometer and a 3-component magnetometer on a non-magnetic platform proximate to the borehole;
  (c) receiving electromagnetic signals from a plurality of satellites at the at least two GPS receivers;
  (d) providing signals indicative of the position of the at least two GPS receivers to a processor;
  (e) measuring three independent components of the earth's magnetic field with the 3-component magnetometer and providing signals indicative thereof to the processor at at least one time within the known time interval;
  (f) measuring three independent components of acceleration using the 3-component accelerometer at the at least one time within the known time interval and providing signals indicative thereof to the processor;
  (g) using the processor to process the signals from the at least two GPS receivers, the 3-component accelerometer and the 3-component magnetometer to determine a local magnetic declination at the at least one time within the known time interval; and
  (h) correcting the set of magnetic survey data from (a) using the determined magnetic declinations in (g) to give a set of corrected survey data of the borehole.

28. The method of claim 27 wherein the non-magnetic platform is floating on a body of water, and using the processor further comprises:
  (i) using an inertial motion sensor (IMU) for providing signals indicative of motion of the non-magnetic platform; and
  (ii) filtering the signals from the IMU, the signals from the at least two GPS receivers, the 3-component accelerometer and the 3-component magnetometer.

29. A method for obtaining corrected survey data in a borehole, comprising:
  (a) conducting a magnetic survey in a borehole over a known time interval to give a set of magnetic survey data referenced to the local magnetic field;
  (b) placing at least three spaced apart Global Positioning Sensor (GPS) receivers and a 3-component magnetometer on a stable non-magnetic platform proximate to the borehole, said three GPS receivers not arranged co-linearly;
  (c) receiving electromagnetic signals from a plurality of satellites at the at least three GPS receivers;
  (d) providing signals indicative of the position of the at least three GPS receivers to a processor;
  (e) using the 3-component magnetometer on the non-magnetic platform to measure three independent components of the earth's magnetic field and providing signals indicative thereof to the processor at at least one time within the known time interval;
  (f) using the processor to process signals from the at least three GPS receivers and the 3-component magnetometer to determine a magnetic declination at the at least one time within the known time interval; and
  (g) correcting the set of magnetic survey data from (a) using the determined magnetic declinations in (f) to give a set of corrected survey data of the borehole.

30. The method of claim 29 wherein the non-magnetic platform is floating on a body of water, and using the processor further comprises:
  (i) using an inertial motion sensor (IMU) for providing signals indicative of motion of the non-magnetic platform; and
  (ii) filtering the signals from the IMU, the signals from the at least two GPS receivers, the 3-component accelerometer and the 3-component magnetometer.

* * * * *

UNITED STATES PATENT AND TRADEMARK OFFICE
CERTIFICATE OF CORRECTION

| | |
|---|---|
| PATENT NO. | : 6,212,476 B1 |
| DATED | : April 3, 2001 |
| INVENTOR(S) | : Noy et al. |

It is certified that error appears in the above-identified patent and that said Letters Patent is hereby corrected as shown below:

<u>Title page,</u>
Item [60], please delete "09/095,471" and insert therefor -- 09/085,471 --.

Signed and Sealed this

Ninth Day of April, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,212,476 B1
DATED : April 3, 2001
INVENTOR(S) : Koen Antonie Noy, Robert Alan Estes and Hatem Salem Morsy It is certified that error appears in the above-identified patent and that said Letters Patent is hereby corrected as shown below:

<u>Title page,</u>
Item [60], Related U.S. Application Data, please delete Provisional application No. "60/095,471" and insert -- 60/085,471 --.

Signed and Sealed this

Twentieth Day of May, 2003

JAMES E. ROGAN
*Director of the United States Patent and Trademark Office*